United States Patent
Wu et al.

(10) Patent No.: US 9,588,308 B1
(45) Date of Patent: Mar. 7, 2017

(54) OPTICAL ELEMENT WITH LIGHT-SPLITTING FUNCTION

(71) Applicant: FORWARD OPTICS CO., LTD., Taichung (TW)

(72) Inventors: Huai-An Wu, Taichung (TW); Wei Shen, Taichung (TW); Yuan-Lin Lee, Taichung (TW)

(73) Assignee: FORWARD OPTICS CO., LTD., Taichung (TW)

( * ) Notice: Subject to any disclaimer, the term of this patent is extended or adjusted under 35 U.S.C. 154(b) by 0 days.

(21) Appl. No.: 15/160,048

(22) Filed: May 20, 2016

Related U.S. Application Data

(63) Continuation-in-part of application No. 15/148,094, filed on May 6, 2016, now Pat. No. 9,541,720.

(51) Int. Cl.
G02B 6/32 (2006.01)
G02B 6/42 (2006.01)

(52) U.S. Cl.
CPC ......... G02B 6/4214 (2013.01); G02B 6/4286 (2013.01)

(58) Field of Classification Search
CPC .......................... G02B 6/4214; G02B 6/4286
USPC ........................................ 385/31, 33, 47, 88
See application file for complete search history.

(56) References Cited

U.S. PATENT DOCUMENTS

| | | | |
|---|---|---|---|
| 4,701,010 A * | 10/1987 | Roberts | G02B 6/2817 385/31 |
| 6,888,988 B2 | 5/2005 | Vancoille et al. | |
| 8,283,678 B2 | 10/2012 | Morioka | |
| 8,335,411 B2 * | 12/2012 | Kuznia | G02B 6/4214 385/14 |
| 8,457,457 B2 | 6/2013 | Morioka | |
| 8,503,838 B2 | 8/2013 | Chen | |
| 8,641,296 B2 * | 2/2014 | Nishimura | G02B 6/4214 385/31 |
| 8,737,784 B2 * | 5/2014 | Kawai | G02B 6/4292 385/47 |
| 8,787,714 B2 | 7/2014 | Morioka | |
| 9,323,013 B2 * | 4/2016 | Shao | G02B 6/4246 |
| 9,377,594 B2 * | 6/2016 | Liff | G02B 6/4214 |
| 2006/0159405 A1 * | 7/2006 | Yajima | G02B 6/4206 385/88 |
| 2008/0166136 A1 * | 7/2008 | Birincioglu | G02B 6/4206 398/212 |
| 2011/0064358 A1 * | 3/2011 | Nishimura | G02B 6/4214 385/33 |
| 2014/0270811 A1 * | 9/2014 | Park | H04B 10/2504 398/212 |

* cited by examiner

*Primary Examiner* — Ellen Kim
(74) *Attorney, Agent, or Firm* — Fish & Richardson P.C.

(57) ABSTRACT

An optical element includes a lens component and a reflecting mirror. The lens component includes first, second and third planes disposed to surround and parallel to a reference axis. The first plane is formed with first, second, third, and fourth collimating units. The second plane is formed with fifth and sixth collimating units. The lens component further includes fourth, fifth, sixth and seventh planes cooperatively defining a groove unit extending along and indented toward the reference axis from the third plane. The fourth and sixth planes extend obliquely relative to said first plane. The reflecting mirror is disposed on the third plane to cover the groove unit and has at least one reflecting plane facing the fourth, fifth, sixth and seventh planes.

9 Claims, 2 Drawing Sheets

OPTICAL ELEMENT WITH LIGHT-SPLITTING FUNCTION

CROSS-REFERENCE TO RELATED APPLICATION

This application is a continuation-in-part (CIP) of co-pending U.S. patent application Ser. No. 15/148,094, filed on May 6, 2016.

FIELD

The disclosure relates to an optical element, more particularly to an optical fiber coupler.

BACKGROUND

With the development of network communication, the urge to provide more data transmission services stimulates an ever-growing demand for increase of network communication bandwidth. Replacing conventional metal wires with optical fibers in wire communication modules for network communication among servers can not only increase the network communication bandwidth, but also lower energy consumption attributed to data transmission. Moreover, the volume of the wire communication modules can also be reduced. Recently, to further reduce the volume of the wire communication modules, multi-channel optical fiber couplers are adopted accordingly to substitute single-channel optical couplers.

In U.S. Pat. No. 6,888,988, No. 8,283,678, and No. 8,457,457, conventional one-piece optical couplers are disclosed for directing a light beam from a light source into an optical fiber. Such conventional optical couplers may be able to, by virtue of the configuration/structure thereof, split the light beam into multiple parts including, e.g., a first part to propagate along a first optical path to be received by the optical fiber, and a second part to propagate along a second optical path to be received by a photo detector for detecting and monitoring the light power thereof. Since a power ratio among the parts of the light beam usually remains constant, the light power of the first part can be calculated from that of the second part detected by the photo detector, thereby allowing power adjustment of the light source to provide a relatively stable power input for the optical fiber. However, such one-piece conventional optical fiber couplers require delicate manufacturing processes and thus have relatively high production costs and relatively low product yields.

U.S. Pat. No. 8,503,838 discloses a two-piece conventional optical fiber coupler, where a component of such conventional optical fiber coupler may be provided with an optical coating for lowering the output power of the light beam to be received by the optical fiber. Although it is relatively simple to manufacture each component of the conventional optical fiber coupler in comparison with the aforesaid one-piece optical fiber couplers, both components still have three-dimensional structures, such as grooves or convex surfaces which are relatively difficult to form, and the assembling tolerance becomes an important factor that affects the reliability of the same.

In U.S. Pat. No. 8,787,714, there is disclosed a three-piece conventional optical fiber coupler which further includes a main body, a prism, and a light filter which can be replaced for adjusting the output light power. However, adhesives are required for connecting the prism to the main body, and air bubbles in the adhesive may adversely affect the optical property of such conventional optical fiber coupler.

SUMMARY

Therefore, an object of the disclosure is to provide an optical element that can alleviate at least one of the drawbacks of the prior art.

According to one aspect of the disclosure, an optical element with light-splitting function includes a lens component and a reflecting mirror.

The lens component includes first, second and third planes disposed to surround and parallel to a reference axis. The first plane is formed with a first collimating unit, a second collimating unit, a third collimating unit, and a fourth collimating unit. The first, second, third and fourth collimating units are mutually spaced apart. The second plane is formed with a fifth collimating unit, and a sixth collimating unit that is spaced apart from the fifth collimating unit. The lens component further includes a fourth plane, a fifth plane, a sixth plane and a seventh plane that cooperatively define a groove unit extending along and indented toward the reference axis from the third plane. The fourth and sixth planes extend obliquely relative to the first plane.

The reflecting mirror is disposed on the third plane to cover the groove unit and has at least one reflecting plane facing said fourth, fifth, sixth and seventh planes.

When a first light beam incident from the first collimating unit propagates within the lens component along a first optical path to reach the fourth plane, one part of the first light beam is reflected by the fourth plane toward the second collimating unit and propagates along a first monitoring optical path to exit the lens component, and the other part of the first light beam enters, by refraction through the fourth plane, and propagates within the groove unit to be reflected by the at least one reflecting plane of the reflecting mirror, followed by entering, by refraction through said fifth plane, and propagating within the lens component along a second optical path toward the fifth collimating unit to exit the lens component. When a second light beam incident from the third collimating unit propagates within the lens component along a third optical path to reach the sixth plane, one part of the second light beam is reflected by the sixth plane toward the fourth collimating unit and propagates along a second monitoring optical path to exit the lens component, and the other part of the second light beam enters, by refraction through the sixth plane, and propagates within the groove unit to be reflected by the at least one reflecting plane of the reflecting mirror, followed by entering, by refraction through the seventh plane, and propagating within the lens component along a fourth optical path toward the sixth collimating unit to exit the lens component.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
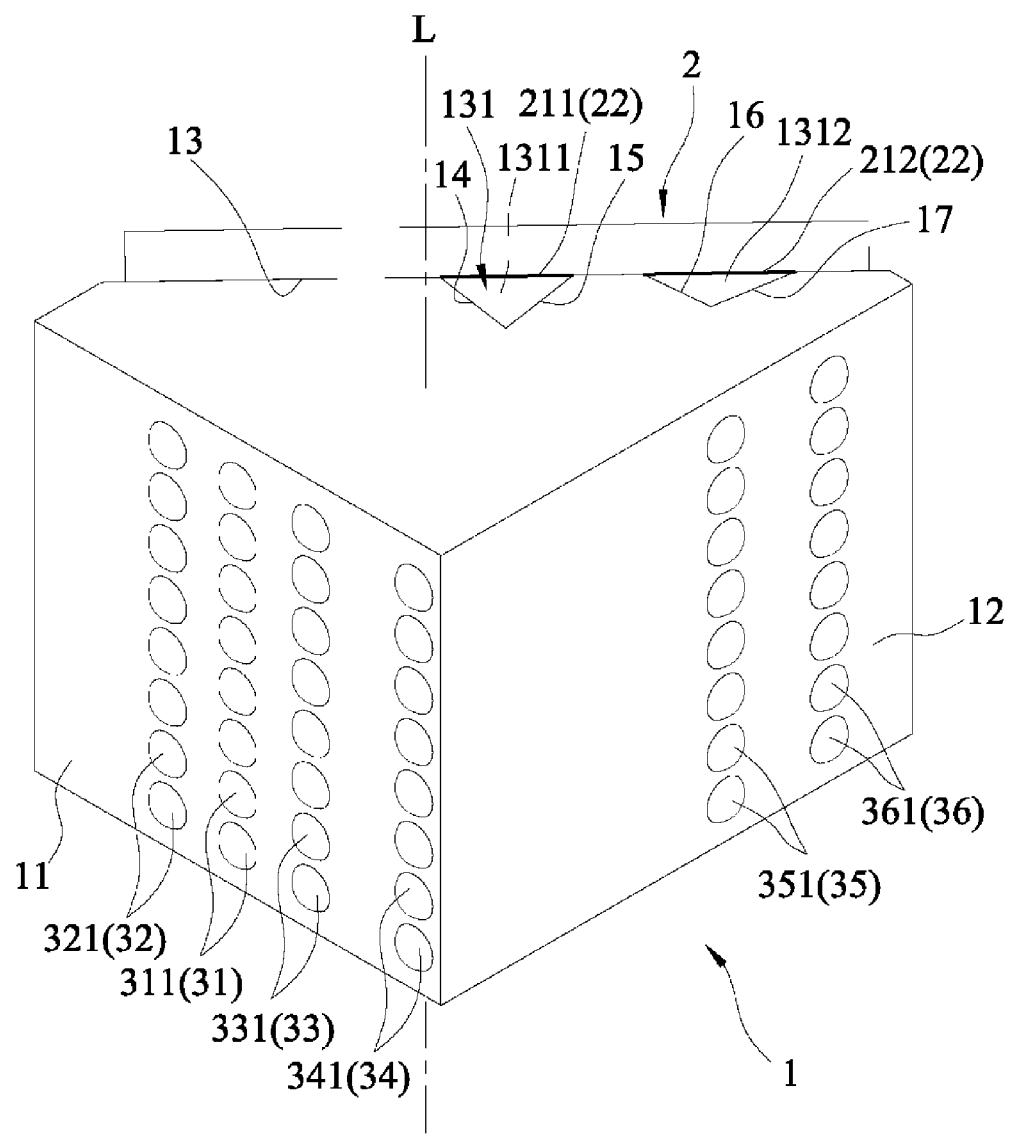
FIG. 1 is a perspective view illustrating an exemplary embodiment of an optical element according to the disclosure.
Figure 2:
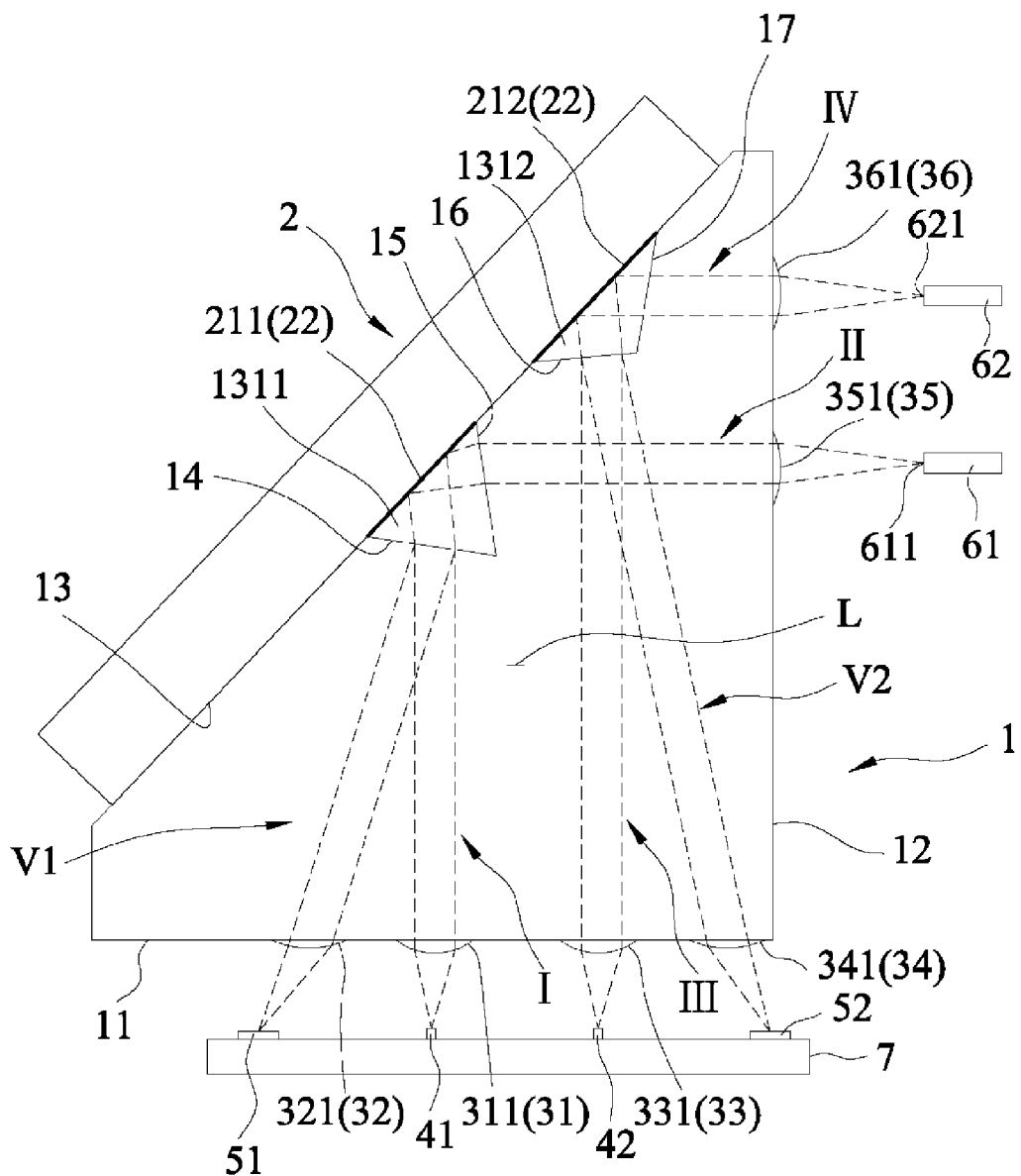
FIG. 2 is a side schematic view of the exemplary embodiment.

Referring to FIGS. 1 and 2, one exemplary embodiment of an optical element with light-splitting function is shown to include a lens component 1 and a reflecting mirror 2.

As illustrated in FIG. 1, the lens component 1 extends along a reference axis (L) and includes a first plane 11, a second plane 12, and a third plane 13 which are disposed to surround the reference axis (L) and are parallel to the reference axis (L). In this embodiment, the lens component 1 is made of plastic, but can be made of glass in other embodiments according to the present disclosure. In this embodiment, the lens component 1 further includes a fourth plane 14, a fifth plane 15, a sixth plane 16, and a seventh plane 7 each extending along the reference axis (L). The fourth, fifth, sixth, and seventh planes 14, 15, 16, 17 cooperatively define a groove unit 131 extending along and indented toward the reference axis (L) from the third plane 13. In this embodiment, the groove unit 131 includes a first groove 1311 defined by the fourth and fifth planes 14, 15, and a second groove 1312 defined by the sixth and seventh planes 16, 17 as illustrated in FIG. 1. It should be noted that, in certain embodiments, the groove unit 131 may include one single groove which is defined by the fourth, fifth, sixth and seventh planes 14, 15, 16, 17. As shown in FIG. 2, the fourth and sixth planes 14, 16 extend obliquely relative to the first plane 11, i.e., either one of the fourth and sixth planes 14, 16 is not parallel to the first plane 11.

In this embodiment, the first plane 11 is formed with a first collimating unit 31, a second collimating unit 32, a third collimating unit 33, and a fourth collimating unit 34. The first, second, third and fourth collimating units 31, 32, 33, 34 are mutually spaced apart as illustrated in FIG. 1. The second plane 12 is formed with a fifth collimating unit 35, and a sixth collimating unit 36 that is spaced apart from the fifth collimating unit 35. As illustrated in FIG. 1, in this embodiment, the first collimating unit 31 is disposed adjacent to the third collimating unit 33, the second collimating unit 32 is disposed opposite to the third collimating unit 33 relative to the first collimating unit 31, and the fourth collimating unit 34 is disposed opposite to the first collimating unit 31 relative to the third collimating unit 33. In greater detail, the first collimating unit 31 includes a plurality of spaced-apart first collimating lenses 311 arranged along the reference axis (L), the second collimating unit 32 includes a plurality of spaced-apart second collimating lenses 321 arranged along the reference axis (L), the third collimating unit 33 includes a plurality of spaced-apart third collimating lenses 331 arranged along the reference axis (L), the fourth collimating unit 34 includes a plurality of spaced-apart fourth collimating lenses 341 arranged along the reference axis (L), the fifth collimating unit 35 includes a plurality of spaced-apart fifth collimating lenses 351 arranged along the reference axis (L), and the sixth collimating unit 36 includes a plurality of spaced-apart sixth collimating lenses 361 arranged along the reference axis (L).

The reflecting mirror 2 is disposed on the third plane 13 of the lens component 1 to cover the groove unit 131, and has at least one reflecting plane facing the fourth, fifth, sixth and seventh planes 14, 15, 16, 17 of the lens component 1. In this embodiment, the reflecting mirror 2 includes a first reflecting plane 211 facing the fourth and fifth planes 14, 15, and a second reflecting plane 212 facing the sixth and seventh planes 16, 17 as shown in FIG. 1. In this embodiment, the reflecting mirror 2 may further have a reflective coating 22 formed on each of the first and second reflecting planes 211, 212. The reflecting mirror 2 may be made of one of glass, metal and plastic. In this embodiment, the reflecting mirror 2 is made of glass and is planar.

When using the optical element of the present disclosure as a multi-channel optical fiber coupler, a plurality of first light sources 41, e.g. lasers, may be disposed corresponding respectively to the first collimating lenses 311, a plurality of second light sources 42 may be disposed corresponding respectively to the third collimating lenses 331, a plurality of first photo detectors 51 may be disposed corresponding respectively to the second collimating lenses 321, a plurality of second photo detectors 52 may be disposed corresponding respectively to the fourth collimating lenses 341, receiving ends 611 of a plurality of first optical fibers 61 may be disposed corresponding respectively to the fifth collimating lenses 351, and receiving ends 621 of a plurality of second optical fibers 62 may be disposed corresponding respectively to the sixth collimating lenses 361 as shown in FIG. 2.

When a first light beam from each of the first light sources 41 enters the lens component 1 via a respective one of the first collimating lenses 311 and propagates within the lens component 1 along a first optical path (I) to reach the fourth plane 14, one part of the first light beam from each of the light sources 41 is reflected by the fourth plane 14 toward a respective one of the second collimating lenses 321 along a first monitoring optical path (V1) so as to exit the lens component 1 and to be detected by a respective one of the first photo detectors 51. In the meantime, the other part of the first light beam from each of the first light sources 41 enters the first groove 1311 by refraction through the fourth plane 14 and propagates within the first groove 1311 to be reflected by the first reflecting plane 211 of the reflecting mirror 2, followed by entering the lens component 1 again, by refraction through the fifth plane 15, and propagating along a second optical path (II) toward a respective one of the fifth collimating lenses 351, so as to exit the lens component 1 and to be received by the receiving end 611 of a respective one of the first optical fibers 61.

Similarly, when a second light beam from each of the second light sources 42 enters the lens component 1 via a respective one of the third collimating lenses 331 and propagates within the lens component 1 along a third optical path (III) to reach the sixth plane 16, one part of the second light beam from each of the second light sources 42 is reflected by the sixth plane 16 toward a respective one of the fourth collimating lenses 341 along a second monitoring optical path (V2) so as to exit the lens component 1 and to be detected by a respective one of the second photo detectors 52. In the meantime, the other part of the second light beam from each of the second light sources 42 enters the groove 1312 by refraction through the sixth plane 16 and propagates within the second groove 1312 to be reflected by the second reflecting plane 212 of the reflecting mirror 2, followed by entering the lens component 1 again, by refraction through the seventh plane 17, and propagating along a fourth optical path (IV) toward a respective one of the sixth collimating lenses 361, so as to exit the lens component 1 and to be received by the receiving end 621 of a respective one of the second optical fibers 62.

It is worth noting that, an angle between the first plane 11 and the fourth plane 14 may be proportional to a distance between each of the first collimating lenses 311 and a respective one of the second collimating lenses 321, and an angle between the first plane 11 and the sixth plane 16 may be proportional to a distance between each of the third collimating lenses 331 and a respective one of the fourth collimating lenses 341. In this embodiment, the angle between the first and fourth planes 11, 14 may range from 5° to 35°, and the angle between the first and sixth planes 11, 16 may range from 5° to 35°. It is also worth noting that an angle between the fourth plane 14 and the fifth plane 15 may be adjusted in accordance with the angle between the first plane 11 and the fourth plane 14, and, similarly, an angle between the sixth and seventh planes 16, 17 may be adjusted in accordance with the angle between the first and sixth planes 11, 16. In this embodiment, the second optical path (II), as well as the fourth optical path (IV), is perpendicular to the second plane 12, but is not limited thereto according to the present disclosure. Also, the first plane 11 may be perpendicular to the second plane 12.

It is also worth noting that by way of the arrangement of the first, second, third and fourth collimating lenses 311, 321, 331, 341, the first and second light sources 41, 42 and the first and second photo detectors 51, 52 may be arranged into four corresponding rows. When the first and second light sources 41, 42 and the first and second photo detectors 51, 52 are provided on a single circuit board 7 as illustrated in FIG. 2, such arrangement may facilitate the layout of the circuit board 7.

The two-piece configuration of the optical element according to the present disclosure is capable of splitting each of the first and second light beams so as to have the corresponding parts of the first and second light beams propagating along the first and second monitoring optical paths (V1, V2) to be detected by the respective one of the first and second photo detectors 51, 52 for monitoring the input power of the first and second light beams. In addition, in the embodiments where the reflecting mirror 2 is planar and is made of glass, surface coating on the reflecting mirror 2 is relatively simple and cost-effective as opposed to having the same coating on plastic lens elements as disclosed by the prior art. By adjusting the reflectance of the reflecting mirror 2, e.g., having different reflective coatings 22, the input power of the other part of the first and second light beams received by the receiving ends 611, 621 of the first and second optical fibers 61, 62 can be effectively lowered. Also, since no adhesive is required in either one of the first, second, third and fourth optical paths (I, II, III, IV), and the first and second monitoring optical paths (V1, V2), the aforementioned problem with respect to the air bubbles in the adhesive can be prevented.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical element with light-splitting function, comprising:
a lens component including first, second and third planes disposed to surround and parallel to a reference axis, said first plane being formed with a first collimating unit, a second collimating unit, a third collimating unit, and a fourth collimating unit, said first, second, third and fourth collimating units being mutually spaced apart, said second plane being formed with a fifth collimating unit, and a sixth collimating unit that is spaced apart from said fifth collimating unit, said lens component further including a fourth plane, a fifth plane, a sixth plane and a seventh plane that cooperatively define a groove unit extending along and indented toward said reference axis from said third plane, said fourth and sixth planes extending obliquely relative to said first plane; and
a reflecting mirror disposed on said third plane to cover said groove unit and having at least one reflecting plane facing said fourth, fifth, sixth and seventh planes,
wherein, when a first light beam incident from said first collimating unit propagates within said lens component along a first optical path to reach said fourth plane, one part of the first light beam is reflected by said fourth plane toward said second collimating unit and propagates along a first monitoring optical path to exit said lens component, and the other part of the first light beam enters, by refraction through said fourth plane, and propagates within said groove unit to be reflected by said reflecting plane of said reflecting mirror, followed by entering, by refraction through said fifth plane, and propagating within said lens component along a second optical path toward said fifth collimating unit to exit said lens component;
wherein, when a second light beam incident from said third collimating unit propagates within said lens component along a third optical path to reach said sixth plane, one part of the second light beam is reflected by said sixth plane toward said fourth collimating unit and propagates along a second monitoring optical path to exit said lens component, and the other part of the second light beam enters, by refraction through said sixth plane, and propagates within said groove unit to be reflected by said reflecting plane of said reflecting mirror, followed by entering, by refraction through said seventh plane, and propagating within said lens component along a fourth optical path toward said sixth collimating unit to exit said lens component.

2. The optical element according to claim 1, wherein said groove unit includes a first groove defined by said fourth and fifth planes, and a second groove defined by said sixth and seventh planes, said reflecting mirror having a first reflecting plane facing said fourth and fifth planes, and a second reflecting plane facing said sixth and seventh planes.

3. The optical element according to claim 2, wherein said first collimating unit is disposed adjacent to said third collimating unit, said second collimating unit is disposed opposite to said third collimating unit relative to said first collimating unit, and said fourth collimating unit is disposed opposite to said first collimating unit relative to said third collimating unit.

4. The optical element according to claim 1, wherein said first collimating unit includes a plurality of spaced-apart first collimating lenses arranged along said reference axis, said second collimating unit includes a plurality of spaced-apart second collimating lenses arranged along said reference axis, said third collimating unit includes a plurality of spaced-apart third collimating lenses arranged along said reference axis, said fourth collimating unit includes a plurality of spaced-apart fourth collimating lenses arranged along said reference axis, said fifth collimating unit includes a plurality of spaced-apart fifth collimating lenses arranged along said reference axis, and said sixth collimating unit includes a plurality of spaced-apart sixth collimating lenses arranged along said reference axis.

5. The optical element according to claim 1, wherein an angle between said first plane and said fourth plane ranges from 5° to 35°, and an angle between said first plane and said sixth plane ranges from 5° to 35°.

6. The optical element according to claim 1, wherein said first plane is perpendicular to said second plane.

7. The optical element according to claim 1, wherein said lens component is made of one of glass and plastic.

8. The optical element according to claim 1, wherein said reflecting mirror is made of one of glass, metal and plastic.

9. The optical element according to claim 1, wherein said reflecting mirror has a reflective coating formed on said at least one reflecting plane.

* * * * *